FIG. 1

INVENTORS.
WILLIAM POTTER
EDGARDO PARSI

United States Patent Office 2,785,955
Patented Mar. 19, 1957

2,785,955

METHOD FOR RECOVERING BASE IONS FROM WASTE SULFITE LIQUOR AND PRODUCING SULFITE COOKING LIQUOR

William Potter, Quincy, and Edgardo Parsi, Boston, Mass., assignors to Ionics Incorporated, Cambridge, Mass., a corporation of Massachusetts Application April 26, 1952, Serial No. 284,524

1 Claim. (Cl. 23—129)

This invention relates to methods for producing cooking liquor for the production of paper pulp. It has reference to the production of so-called neutral sulfite cooking liquors of the type employed in making either semichemical sulfite pulp, full-chemical sulfite pulp frequently referred to as full monosulfite pulp, and also to the production of acid sulfite cooking liquors used in the production of acid sulfite pulp. The neutral sulfite cooking liquors, which are usually used in the pulping of hard woods, are produced from normal sulfites, as distinguished from acid sulfites, while the acid sulfite cooking liquors are largely solutions of acid sulfites usually with an excess of sulfur dioxide present. The invention is particularly concerned with those cooking liquors of both types, which have as their metallic or base component, sodium or potassium. Actually the so-called neutral sulfite liquors are not usually strictly neutral but are more nearly so than other types of cooking liquors which are distinctly acid or alkaline. Neutral sulfite cooking liquors frequently have a pH well above 7.0 and provide a waste liquor having a pH as high as 8.0.

The invention relates also to the cyclic production and use of such cooking liquors by a method in which the valuable ingredients are continuously recovered and reused in the pulping of successive quantities or charges of wood or other cellulosic raw material.

It has long been appreciated that neutral sulfite cooking liquors, such as those consisting primarily of solutions of sodium sulfite with a certain amount of the corresponding carbonate, are desirable from the standpoint of relatively high yields of pulp from the wood or other cellulosic source material and the production of a good grade of pulp. They are particularly useful in the pulping of hard woods. However, neutral sulfite cooking processes as heretofore practiced, particularly in mills not equipped to carry on kraft or sulfate pulp producing operations in conjunction with the sulfite pulping operations, have involved such heavy losses of the valuable constituents, such as the sodium and sulfur as to be substantially prohibitive from the standpoint of cost. The use of sodium or potassium based acid sulfite cooking liquors has been restricted for similar reasons. One method of reducing the loss of valuable constituents from sulfite cooking operations is disclosed in the copending patent application of Gerald Haywood, Serial No. 235,614, filed July 7, 1951, now Patent No. 2,736,635, granted February 28, 1956.

A primary object of the present invention has been to provide an improved method of recovering and producing sulfite cooking liquor for neutral or acid sulfite pulp producing processes, of the semi-chemical or full-chemical types indicated above, which will enable such processes to be operated with sufficient economy of the valuable components of the cooking liquor as to be commercially competitive with, and even less expensive than, other methods of producing sulfite pulp. It will be understood that the term "semi-chemical sulfite pulp" refers to that type of pulp which is produced by removing the lignins of the raw material, without removing most of the pentosans and similar constituents, by cooking with a sulfite liquor and then forming the partially cooked material into a usable pulp by physical means, such as mechanical disintegrators and the like. The terms "full chemical sulfite pulp" and "full monosulfite pulp" are commonly used to designate pulps which are produced from wood or the like in a form usable for the production of paper or paper products through the use of a neutral sulfite cooking liquor without the necessity of subsequent mechanical disintegration. The character of the cooking liquor, the quantity employed in the pulping of a given amount of the raw material and the length of time required for the cooking step differ with the type of process employed.

In accordance with the present invention the sulfite cooking liquor is formed, at least in large part, by recovering sodium or potassium, together with the desired acid or active component from a prior cooking liquor by a suitable ion exchange procedure. This involves contacting an appropriate strongly acid cation exchange resin partially in the sodium or potassium form with an acid sulfite solution such as sulfurous acid or a solution of sulfur dioxide in water, or the like to bring about an exchange of hydrogen from the acid for at least a part of the sodium or potassium of the resin to produce thereby a solution containing bisulfite, at least in part, and subsequently contacting this solution with a weakly acid cation exchange resin primarily in the sodium or potassium form to bring about an additional exchange of hydrogen ions for at least a part of the sodium of the resin. The resulting solution is in a form suitable for use, with or without subsequent concentration, dilution, additions or other treatment, as a neutral or acid sulfite cooking liquor depending upon the conditions under which the exchange is carried out. While the invention will be described in connection with sodium as the base component, it is to be understood that potassium may be substituted therefor.

The acidic material used in the foregoing procedure is in part derived from the waste liquor of a prior sulfite cooking operation. A certain amount of sulfur dioxide is recovered or produced from such liquor and is dissolved in water to form at least a part of the acid required. The cation exchange resins, which have been converted from the sodium form to the hydrogen form, by the foregoing procedure, are recharged with sodium by contacting with an alkaline liquor, or components thereof, derived from the smelting of a prior neutral or acid sulfite cooking liquor. In this way a cyclic process is provided in which a continuous supply of cooking liquor is available for the pulping of successive batches of wood or other cellulosic material with the addition of only sufficient fresh liquor, or constituents thereof, as may be required to make up for losses in the cyclic operations.

As will appear from the detailed description hereinafter, the present invention not only contemplates the recovery of most of the sodium or other base constituent and sulfur from the waste liquors, but also certain other constituents are separated and may advantageously be burned with the production of heat required in the operations.

Certain ion exchange resins have been found to be more efficient than others in the absorption of sodium from solution in exchange for hydrogen, but at the same time, the resins which are more efficient in this step have been found to be less efficient in the reverse operation, i. e., in the exchange of the sodium for the hydrogen of sulfurous acid in the course of producing the desired fresh cooking liquor. Strongly acid resins, such as those of the sulfonic type have been found to be of this character. Other resins, of the weakly acid type such as the carboxylic resins, have been found to present the reverse situation. Thus, they have been found to be readily convertible, with good efficiency from the sodium form to the hydrogen form upon contact with sulfurous acid, but they are less efficient in the reverse exchange. Accordingly, when a sodium-containing solution is passed through a column containing such a weakly acidic resin, there is danger of substantial leakage of the sodium ion which will remain in the effluent from the column. Efficient recovery of sodium ions from alkaline waste liquors derived from the smelting of sulfite cooking liquors and economical production of fresh sulfite cooking liquor can be provided by the employment of two columns in series, one column containing a weakly acid resin and the other a strongly acid resin. The alkaline liquor is first passed through a column containing the weakly acid exchanger which will remove a substantial portion of the sodium ions. Hydrogen sulfide is evolved and sodium is absorbed by the column. The effluent from the first column is then passed through a second column containing an exchanger of the strongly acid type which will effectively remove a high percentage of the remaining sodium ions and liberate hydrogen sulfide and some carbon dioxide. In the subsequent recovery step, the acidic agent, such as sulfurous acid, is first passed through the column containing the strongly acid exchanger wherein, by exchange of some of the hydrogen ions, it will remove a substantial part of the sodium ions picked up by the column in the preceding stage.

The effluent is then passed through the column containing the weakly acid resin where it will efficiently remove a high percentage of the sodium ions previously absorbed in that column. It will be understood, of course, that the recovery of the sodium ions will not necessarily be complete, but by the two-stage process described a quite high percentage of recovery will be effected. Furthermore, the effluent from the second column may readily be made of a suitable character for use as a fresh neutral or acid sulfite cooking liquor for a succeeding cooking operation. By the use of sulfurous acid of appropriate strength in the regeneration of the beds of the two columns, the effluent from the final column may be satisfactory as a cooking liquor without material modification. However, if desired, the process may be so carried out that the effluent will require some modification either by way of concentration, dilution, or addition of other active ingredients prior to the use thereof as a cooking liquor. Certain unavoidable losses of valuable ingredients are encountered in the pulp and in the subsequent preparation of the alkaline sodium liquor. These losses must be made up by addition of appropriate sodium and sulfur compounds.

Because of the composition desired for the fresh cooking liquor, namely, that it have a particular ratio of sulfite to carbonate and a particular quantity and concentration of sodium and sulfur, it is desirable to use in the regeneration of the ion exchange columns, toward the hydrogen form, a quantity of sulfurous acid which will produce in the effluent an amount of free and combined sulfur dioxide at least equivalent to that which must be present in the fresh cooking liquor. Any bisulfite or sulfurous acid present in the effluent in excess of that desired may be readily neutralized with sodium carbonate, sodium bicarbonate or sodium hydroxide. To avoid the necessity of concentrating the fresh cooking liquor, it is preferable to use a concentration of sulfurous acid which will produce an effluent having a total sulfur dioxide concentration equal to or greater than that which must be present in the cooking liquor. It has been found, however, that efficient use of regenerant increases with increasing dilution so that it is preferable to use the lowest concentration of sulfurous acid consistent with the required concentration in the cooking liquor.

It is known to the ion exchange art that exchange reactions are less efficient in concentrated solutions. This inefficiency is due largely to an effect described as Donnan absorption, the absorption of salt, at high concentrations of solutions, over and above the ions absorbed by the exchange reaction proper. The effect is manifested, for example, when a cation exchange resin in the sodium form is immersed in a concentrated solution of a sodium salt. Salt from the solution is found to diffuse into the exchanger until an equilibrium is attained in which the concentration of the external solution has been reduced and the exchanger contains substantial quantities of salt. Consequently in ion exchange processes in concentrated solutions the average effluent solution is less concentrated than the influent, and the resin, especially in the case where a reaction is possible between the exhausting solution and the regenerating solution, may have to be washed free of diffused salts to prevent unwanted side reactions. Because of this effect, in the method of the invention, a certain loss of sodium and sulfur occurs in absorption of green or white liquor and in regeneration with sulfurous acid. It is therefore necessary to increase the amount of sulfurous acid used in order to obtain a fresh cooking liquor containing the requisite amount of sulfite ion. The extent of this correction will be illustrated in the examples.

The green or white liquor may be concentrated or diluted before absorption and the effluent from the regeneration may be concentrated or diluted, these treatments depending upon economic and other requirements of operation, the efficacy of any of these treatments being subject to the phenomena described above.

It is common in the neutral sulfite pulp industry to use a cooking liquor based on sodium and containing carbonate and sulfite in such proportions as to have a pH of 10.5 to 11.5. Neutral sulfite liquors are commonly used in semi- and full-chemical reduction of the wood. A typical liquor for semi-chemical pulping comprises about 16 percent sodium sulfite and about 3 to 4 percent of sodium carbonate on the basis of the weight of the wood. The sodium sulfite concentration may be 4 to 5 percent of the weight of the water. About 600 to 700 pounds of chemicals per ton of pulp are required. If the digestion with this liquor is conducted under proper conditions and the pulp finally defibered by mechanical disintegration, only about 30 percent of the wood is dissolved and the resulting pulp comprising about 70% of the original wood, has desirable properties. About 200 to 300 pounds more pulp are obtained per cord of wood than when full chemical digestion is employed.

A typical liquor for full mono-sulfite pulping comprises about 45 percent sodium sulfite and about 1.3% sodium carbonate on the basis of the weight of the wood. The sodium sulfite concentration may be 10–12 percent of the weight of the water. About 1530 pounds of $Na_2CO_3$ and 455 pounds of sulfur, per ton of pulp, are required.

After the reduction of the wood, the defibered cellulose is separated from the cooking liquor and washed to remove most of the soluble and colloidal content. The spent cooking liquor and concentrated wash water are combined and ordinarily contain most of the cooking chemicals (the remainder having been lost in washing), solubilized lignin, cellulose and other wood components. This solution with its suspended materials is known in the trade as black liquor and, because of its organic content, a substantial portion thereof is not reusable.

In accordance with a preferred method of practicing the present invention, part of the cooking chemicals in the black liquor is recovered in a condition suitable for reuse by evaporating the waste liquor to obtain the solid content thereof; smelting the solid content to obtain sodium and other non-volatile sulfides and carbonates and to destroy organic constituents; leaching the resulting smelt with water to obtain a solution of soluble salts of the sulfides and carbonates (commonly referred to as green liquor); clarifying the green liquor to remove suspended matter; contacting a solution of the green liquor with a weakly acid hydrogen exchange resin and with a strongly acid hydrogen exchange resin to absorb at least part of the sodium, thereby exhausting the resin at least partially and liberating hydrogen sulfide and possibly carbon dioxide; burning the hydrogen sulfide to obtain dilute gaseous sulfur dioxide; contacting the exhausted exchangers with a regenerant comprising sulfurous acid; separating the exchange resins from the regenerant; and adjusting the pH of the separated regenerant with sodium hydroxide, carbonate or bicarbonate. As will be explained more fully hereinafter, white liquor may be used in place of green liquor in the exchange absorption step.

The economical recovery of the cation base of the green or white liquor can be increased above that possible with a single exchange bed. The evaporation of the black liquor may be carried out in conventional evaporators suitable for this purpose, for example, in multiple effect evaporators. Ordinarily the final stages of evaporation are carried out by means of contact evaporators, for example, disc evaporators utilizing waste heat.

The solid content may be smelted in any of those furnaces normally used by the industry, those having provisions for waste heat recovery being especially satisfactory. The ash from the smelting furnace may contain fragments of furnace brick, unburned carbon, insoluble sulfides, carbonates and sulfates and other materials. Considerable amounts of solid material may leave the smelter with the gases generated and may be recovered if desired by means of an electrostatic precipitator or by sonic agglomeration (the material so recovered being preferably added to the evaporated liquor influent to the smelting furnace).

The smelt from the furnace may be dissolved in water or in a solution obtained from other sources, for example, as shown below. Suspended insoluble material is removed by clarifiers to avoid sedimentation in the resin beds and consequent interference with the exchange reaction.

In the absorption step, hydrogen sulfide and carbon dioxide are evolved by the exchange of the hydrogen of the resins for the sodium of the green or white liquor. The gases frequently cause channelling of the liquor and consequent inefficient use of the exchangers. Some of the exchange resins suitable for the method of this invention exhibit a considerable increase in volume upon passing from the hydrogen form to the sodium form. This swelling may so compact the resin as to result in excessive hydraulic pressure drop and excessive channelling of the liquor. In some cases the swelling may be so great as to result in rupture of the resin container. It has been found that the gases formed during absorption may be freely evolved and resins which have a high swelling tendency may be utilized by passing the green or white liquor solution upwardly through the resin beds at such a velocity as to suspend the resin particles, i. e., a linear velocity at which the resin particles are fluidized. The granules are thereby mutually separated from each other by the solution. The gases liberated readily pass through the beds without channelling of the liquid, entrapment of the gas, or compacting of the resin. Linear velocities suitable for this purpose are those in which the buoying force of the upwardly flowing solution on the granules of the resin is equal to or somewhat greater than the downward pull of gravity on the granules of resin. During the course of the absorption, the composition of the flowing solution is not constant with time or along the length of the column so that the density and viscosity of solution vary. Furthermore, the density and size of resin granules depend somewhat on the degree of exhaustion or regeneration and upon the composition of the contacting solution. Commercial resin granules exist in a variety of shapes and sizes and, even in graded resins, there is considerable variation among the granules. Hence, it may be necessary to vary the velocity of upflow during the course of exchange. It must also be noted that density of the green or white liquor solution must be adjusted to be less than the density of the exchange resin granules to avoid "floating" the resin.

The ion exchange resins useful in this invention are solid insoluble materials which are capable of absorbing metallic ions from solutions thereof and replacing them with hydrogen ions and are also capable of being reconverted, at least partially, with acid solutions. Among the suitable strongly acid exchangers for use in this invention are synthetic cation exchange resins based on sulfonic acid groups such as those described in U. S. patents to D'Alelio No. 2,366,007, granted December 26, 1944 and Bauman No. 2,466,675 granted April 12, 1949. Various resins of this character are sold under the trade designation "Dowex–50" (Dow Chemical Co.), "Permutit Q" (Permutit Co.), "Amberlite IR–120" (Rohm & Haas Co.), "Nalcite HCR" (National Aluminate Co.), "Duolite CS–20" (Chemical Process Co.) and "Ionac C–240" American Zeolite Co.). Suitable weakly acid type resins are usually carboxylic type resins. Suitable resins of this character are those based on polyacrylates such as those made in accordance with the teachings of D'Alelio Patent No. 2,340,111 granted January 25, 1944. A typical resin of this character is that sold under the trade designation "Amberlite IRC–50" (Rohm & Haas Co.). Such weakly acid resins may be used effectively only when the waste liquor or a derivative from such liquor is at a pH of not less than 8.0 during the major portion of the absorption step. For the regeneration of the weakly acid resins to the hydrogen form, there may be used in addition to or in lieu of the solutions of sulfurous acid, solutions of bisulfites. These are capable of releasing a substantial portion of their hydrogen in exchange for the sodium of the exchanger.

In the normal use of the method of this invention, absorption and regeneration are repeated, and in a continuous operation, the quantity of sodium eluted in the regeneration step is substantially equal to that taken up in the absorption step.

In the usual manner of operation, the hydrogen of the exchanger is not completely exhausted or regenerated; not all of the sodium is absorbed and not all of the acidity of the regenerant is utilized. The separated spent regenerant may be subsequently neutralized by the addition of sodium hydroxide, carbonate or bicarbonate to bring the sodium content to the desired point for cooking liquor purposes.

With the foregoing purposes, features, and advantages in view, the invention will now be described in greater detail in conjunction with the accompanying drawings in which.

Figure 1:
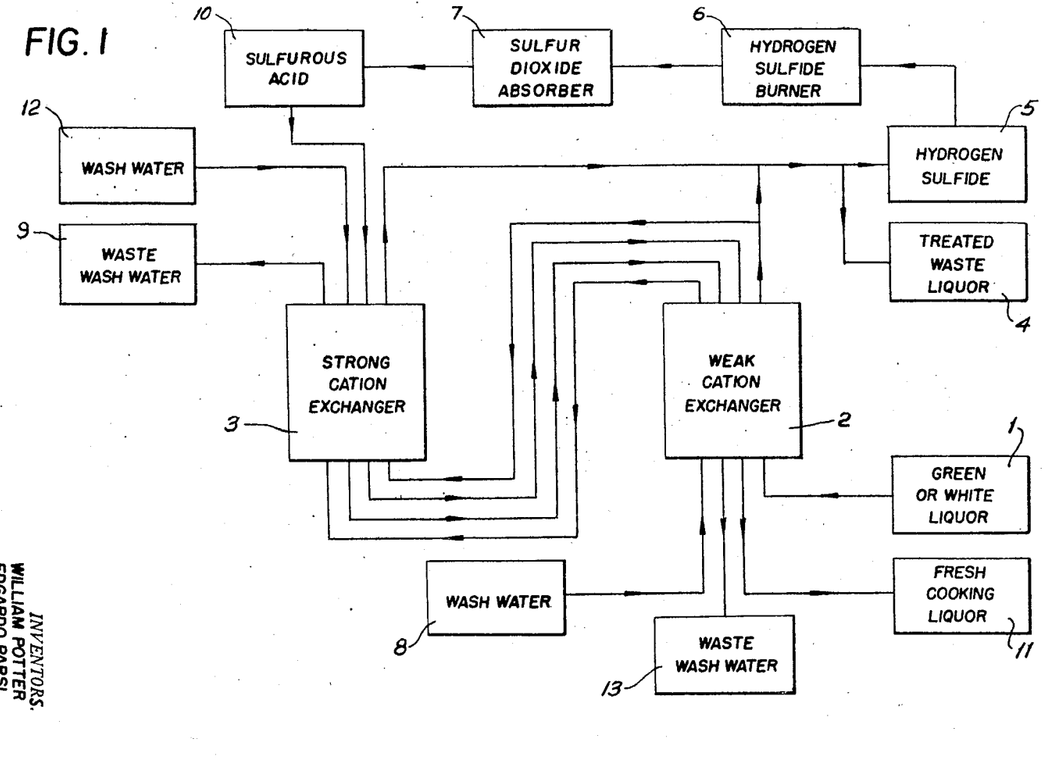
Fig. 1 is a diagrammatic view illustrating a simple process for producing neutral or acid sulfite cooking liquor in accordance with the invention.

Referring now to Fig. 1 of the drawings, there is illustrated schematically a simple arrangement of apparatus for carrying out the improved method of producing fresh cooking liquor. A tank 1 is provided for the storage of green or white liquor derived from the smelting of a previous sulfite cooking operation or a derivative from such liquors. A solution of green or white liquor having a suitable sodium ion content is taken from the tank 1 and led to a weak cation exchange column 2. The latter is filled to an appropriate height with a weakly acid cation exchange resin such as a carboxylic resin (of the character sold by Rohm & Haas Co. under the trade designation "Amberlite IRC–50"). Prior to the introduction of the liquor, the resin should be placed primarily in the hydrogen form as distinguished from the sodium form and the resin voids should be filled with water. The solution of liquor from the tank 1 is passed upwardly through the resin bed and is discharged and led to a strong cation exchange column 3. The gases liberated in column 2 are separated from the effluent liquor and sent to a hydrogen sulfide storage tank 5.

Column 3 is filled to an appropriate height with a strongly acid cation exchange resin, such as a sulfonic resin (of the character sold by Dow Chemical Company under the trade designation "Dowex–50"). Prior to the introduction of the liquor, the resin should be placed primarily in the hydrogen form as distinguished from the sodium form and the resin voids should be filled with water. The liquor effluent from column 2 is passed upwardly through the resin bed in column 3 and is discharged and led to a treated waste liquor storage tank 4. The gases liberated in column 3 are separated from the effluent liquor and sent to the hydrogen sulfide storage tank 5. The rate of flow of liquor through the columns 2 and 3 should be such as to allow fluidization of the resins in the columns so as to permit the free passage of the liberated gases from the columns.

As a result of the ion exchange process within the columns 2 and 3, a solution containing some carbon dioxide and hydrogen sulfide will be delivered to tank 4. If, however, the character of the green liquor solution and the quantity of exchange resins in the column are appropriately selected, the liquor delivered to tank 4 will be substantially free of sodium ions. Ultimate disposition of this liquor will depend upon its composition. It may, for example, be used to make up fresh green or white liquor solution.

When the exchange of hydrogen ions of the resins for the sodium ions of the liquor drops below a point which is commercially practicable and beyond which the effluent from the column 3 contains an unsatisfactorily high concentration of sodium ions, the flow of liquor through the columns is discontinued. The columns are then washed with water preferably by passing water from a tank 8 upwardly through the column 2, then upwardly through column 3, subsequently discharging the wash water to a tank 9. By passing the wash water through the columns in the same direction as the liquor solution was passed, unabsorbed sodium retained in column 2 by Donnan absorption and contained in the voids of the resin bed may be washed out of column 2 and absorbed in column 3 constituting thereby an additional recovery of sodium ions.

The hydrogen sulfide collected in tank 5 is led to a burner 6, forming dilute sulfur dioxide gas which is led to an absorber 7 where it is absorbed in water, forming sulfurous acid which is led to a storage tank 10. In absorber 7, water is preferably passed downflow and sulfur dioxide upflow. Since some of the sulfur from the cooking liquor is lost in pulp washing in the recovery step and in other ways, it is necessary to add sulfur dioxide to make a sulfurous acid solution suitable for regenerating the ion exchange resins to the hydrogen form and for preparing fresh cooking liquor.

To regenerate the ion exchange resins, sulfurous acid is led from the tank 10 to the column 3 passing preferably downwardly through the column and is discharged and led to column 2, preferably passing downwardly through column 2. If the concentration and quantity of sulfurous acid are controlled properly, the effluent solution from column 2 will be satisfactory for use as fresh cooking liquor with or without modifications. Suitable modifications of the effluent may include the addition of an appropriate amount of one or more of the following: sodium carbonate, bicarbonate or hydroxide or ammonium hydroxide. Particularly in the production of acid cooking liquor, it has been found desirable to modify the effluent with addition of ammonia in solution. The quantity of ammonia used will vary up to about 10% of the amount of sodium in the liquor. The ammonia will be lost in the subsequent smelting operation. The added base will react with any excess acidity to produce more sodium sulfite or bisulfite (or ammonium sulfite or bisulfite) and is preferably added in sufficient amount to give the liquor the desired pH.

When the exchange of sodium ions of the resin for hydrogen ions of the acid drops below a point which is commercially practicable and beyond which the effluent from column 2 no longer forms a satisfactory cooking liquor, with or without economically feasible modifications, the flow of acid solution through the columns is discontinued.

After the regeneration step, the columns are washed, preferably by passing water from tank 12 downflow through column 3 and thence downflow through column 2, collecting the water in a tank 13. By this means, acidity not utilized in column 3 can be used in column 2 to effect further regeneration. The wash is continued until the wash waters no longer contain appreciable acidity. The columns are then in condition for a repetition of the cycle. The wash of the ion exchange resins in each half of the exchange cycle is provided to suppress the formation of free sulfur by the interaction of sulfurous acid and sodium sulfide. Free sulfur interferes with the efficient operation of the exchange resins, for example, if free sulfur is present or formed in the regeneration cycle, thio-sulfate formed by the interaction of sulfurous acid and sulfur will be present in the fresh cooking liquor.

In the absorption step, hydrogen sulfide and carbon dioxide are evolved by the exchange of the hydrogen of the resins for the cation of the green liquor. In the case of white liquor, hydrogen sulfide only is evolved. These gases are evolved in such quantities as to cause channelling of the liquor and generally result in inefficient use of the exchange resins. The weekly acid exchange resins most suitable for the method of this invention generally exhibit an undesirably large increase in volume upon passing from the hydrogen form to the sodium form. The swelling may so compact the resin as to result in excessive hydraulic pressure drop and in some cases the swelling may result in rupture of the resin column. This may be overcome, as indicated hereinbefore, by providing a fluidizing flow of the green or white liquor solution upwardly through the resin beds.

Certain parameters are used in the ion exchange industry to describe the operation of an exchange column. The contact time of an exchange reaction is defined as the ratio of the apparent packed volume of resin contained in the column to the volume of solution passing through the resin per minute and is a measure of the time available for exchange. The linear velocity is defined as the ratio of the volume of solution per minute passing through the column multiplied by the volume percent of the resin containing region of the column not occupied by the resin granules to the area of cross section of the column. It has been found that for many exchange reactions efficient operation is accomplished in a narrow range of contact time of solution. It is therefore possible to use a column of such cross section as to provide the desired contact time of solution consistent with the necessary linear flow so as to ensure both sufficient time for exchange and free evolution of gases. It is has been found that the contact time for both regeneration and absorption should lie within the range of approximately 5 to 20 minutes and preferably within the range of approximately 10–12 minutes. The height of the ion exchange columns should be within the range of approximately 15 to 50" high and is preferably about 30" high. With heights below 15", difficulty in securing suitable exchange is experienced, while with heights of over 50", hydraulic difficulties are encountered due to the necessity of maintaining a relatively high velocity of flow.

During the absorption of sodium ions, the resin beds are preferably fluidized as explained above. The resins are therefore substantially uniformly exhausted during the absorption, that is, an exchange gradient is not established in which the degree of exhaustion of the resin bed varies substantially from one portion of the bed to another. Consequently, it is not possible to take full advantage of the countercurrent principle in one pass of the green liquor solution or regenerating solution through the columns. To increase the overall recovery of sodium and sulfur and to increase the efficiency of the process, one or more expedients may be adopted, among which are:

(a) The latter portions of the green liquor solution passed through the columns may be saved and sent again through the columns after a succeeding regeneration step.

(b) Part of the green liquor solution which has been contacted with the ion exchange resins and which contains substantial sodium and sulfur content may be used to make up fresh green liquor solution for a later absorption step.

(c) Part of the wash water following the absorption step may be used to make up fresh green liquor solution or may be processed for sulfur recovery.

(d) Part of the wash water following the regeneration step may be used to make up part of the sulfurous acid regeneration solution for a later regeneration, for example, by recycling to the $SO_2$ absorber. This wash water, or a portion thereof, may also be recycled to the pulp washers.

(e) The latter portions of the sulfurous acid solution passed through the columns may be sent again through the columns after a succeeding absorption step.

(f) A regenerating solution containing excess sulfurous acid may be passed through the columns and the excess sulfurous acid subsequently stripped from the effluent regenerating solution by heating, evacuation or other means. The effluent regenerant may, for example, be passed through a bed of weakly basic anion exchange resin in the base form whereby the excess sulfur dioxide will be absorbed. Subsequently steam is passed upwardly through the bed as described in Dutch Patent 55,207, releasing the sulfur dioxide in substantially concentrated form. The sulfur dioxide recovered in this manner may be reused in regeneration.

(g) The water used to fluidize the beds before the absorption step, i. e., the water sent through the columns before passing the green liquor therethrough, may be reused for the same purpose. This water contains small amounts of sodium and sulfite. Portions of the water may be sent to the $SO_2$ absorber and to the pulp washers, the latter being preferred.

(h) The latter portions of the wash water may be reused in a succeeding cycle as a first portion of a similar wash.

The choice of expedients depends, of course, upon the value of the chemicals saved compared to the additional cost of adopting the expedient. The expedients, can, of course, be used in connection with white liquor as well as green liquor.

Figure 2:
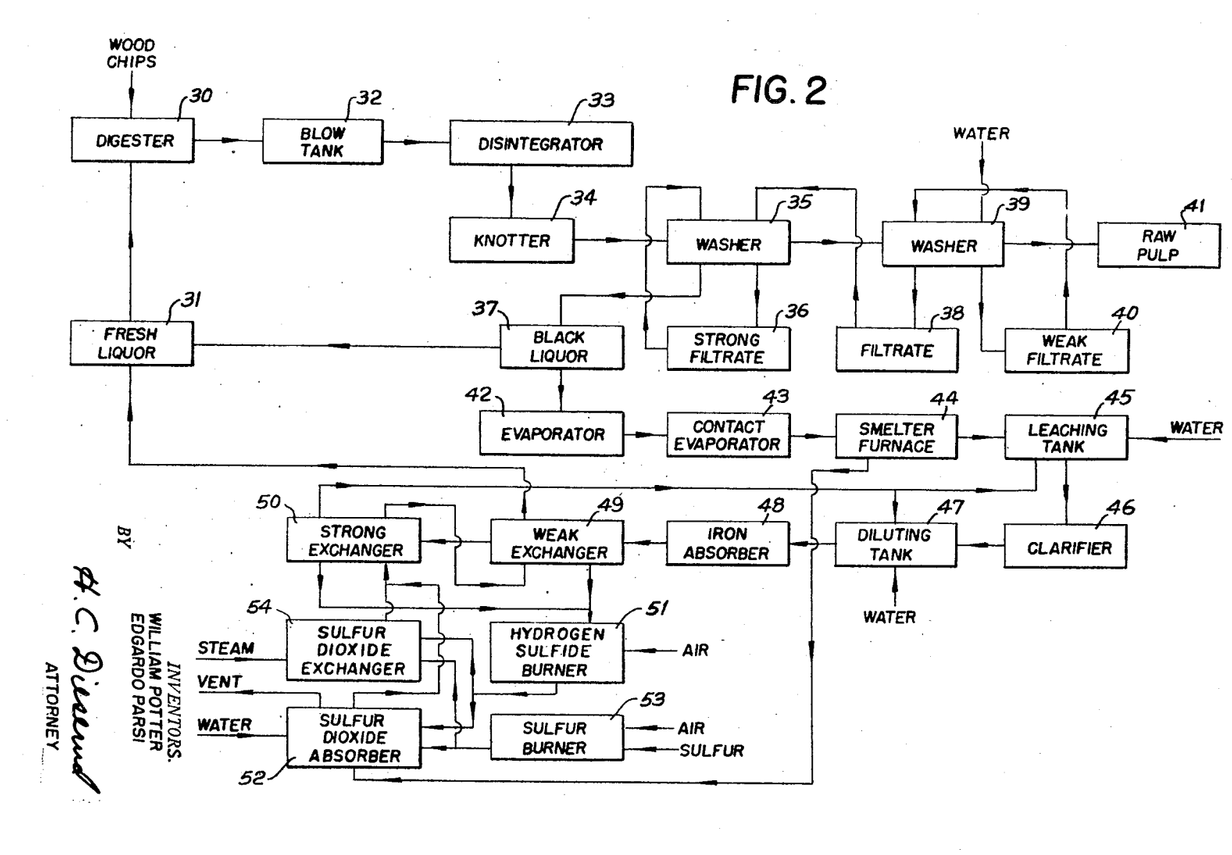
Fig. 2 is a diagrammatic view, in the nature of a flow sheet, illustrating a process by which fresh cooking liquor may be produced and utilized in the pulping of cellulosic material and by which a substantial portion of the valuable constituents may be recovered from the waste liquor and utilized in the production of new cooking liquor.

In Fig. 2 there is schematically shown, in the form of a flow sheet, a procedure and suitable apparatus for the recovery of sodium and of sulphur from the waste liquor of any of the foregoing pulping processes and the use of the recovery constituents in the production of fresh cooking liquor.

Referring to Fig. 2, the digester is indicated schematically at 30. Wood chips or other cellulosic material are charged into the digester and fresh liquor is introduced from a storage tank 31. Digestion is carried out under such conditions of temperature and pressure as are normally employed in neutral or acid sulfite pulping operations. The character of the liquor employed will depend upon whether the process is of the semi-chemical type or full-chemical type and whether of the neutral or acid type. After the digestion has been completed, the contents of the digester are blown into a tank 32, from which they are fed, in the case of semi-chemical pulp, to a disintegrator 33 and then to a knotter 34. In the case of full-chemical pulp the disintegrator is eliminated since the reduction of the wood to the pulp form is completed in the digester. From the knotter any incompletely digested portions of the raw materials are separated from the pulp. The pulp is passed to a washer 35 which is preferably of the sectional type, in the first section of which the pulp is washed with a strong filtrate taken from a tank 36. This filtrate in passing through the pulp washes out the spent cooking liquor and various salts and colloids mentioned above. This constitutes the waste liquor of the process and is passed to a waste or black liquor tank 37. In the second section of the washer the pulp is washed with a weaker filtrate taken from a tank 38. This, in passing through the washer, forms the strong filtrate which is delivered to the tank 36. The partially washed pulp passing from the washer 35 is then passed to a second washer 39 in the first section of which it is washed with a still weaker filtrate taken from a tank 40 and which, after passing through the washer 39, is discharged to the tank 38. In the second section of washer 39 the pulp is washed with plain water and the filtrate from this operation is discharged to the weak filtrate tank 40. The clean pulp emerging from the second washer is delivered to a raw pulp storage tank 41.

A portion of the waste liquor may be delivered from the tank 37 directly to the fresh liquor storage tank 31 for reuse along with the fresh liquor in a subsequent digestion operation. This is for the purpose of reducing the load on the ion exchange columns to be described. However, the major portion of the waste liquor is delivered from the tank 37 to an evaporator 42 which may be of the multiple effect type and then to a contact evaporator 43 which may be of the disc type using waste heat. The residue from the latter is passed to a smelter furnace 44 wherein it is burned to generate heat from the lignins and other burnable constituents leaving a molten ash containing sodium sulfide and sodium carbonate. The smelter furnace may be any of those normally used by the industry, those having provisions for waste heat recovery being especially satisfactory. The ash may contain fragments of furnace brick, unburned carbon, iron, insoluble sulfides, carbonates, sulfates and other materials which must be removed in the succeeding steps. Considerable amounts of solid material may leave the smelter with the flue gases and may be recovered if desired by means of electrostatic or sonic precipitators (the material so recovered being added, if desired, to the evaporated liquor influent to the smelting furnace). A certain amount of sulfur dioxide may be liberated in the furnace, especially in the case of acid liquors, and this may be passed to an absorber 52 in which it is taken up in cold water introduced into this member. The ash from the smelter is discharged to a leaching tank 45 where it is for the most part dissolved in water or effluent from an exchange absorption step to form a solution containing primarily sodium carbonate and sulfide (green liquor). The green liquor is then sent to a clarifier 46 wherein suspended insoluble matter is removed. This step is desirable to prevent clogging of the exchange columns. The clarified liquor is then diluted in a tank 47 with water or with effluent from the exchange absorption step. The dilution increases the efficiency of absorption of sodium to some extent by reducing the amount of Donnan absorption. The concentration is here adjusted to that which is optimum for the exchange.

Increased recovery of sodium and sulfur may be achieved by converting the sodium carbonate content of the green liquor to sodium hydroxide so that white liquor rather than green liquor is supplied to the exchangers. Conversion of the sodium carbonate may be effected by addition of lime which reacts with the sodium carbonate to yield sodium hydroxide and calcium carbonate. The latter being insoluble in water may be separated by settling, filtering or the like.

Figures 2A, 3:
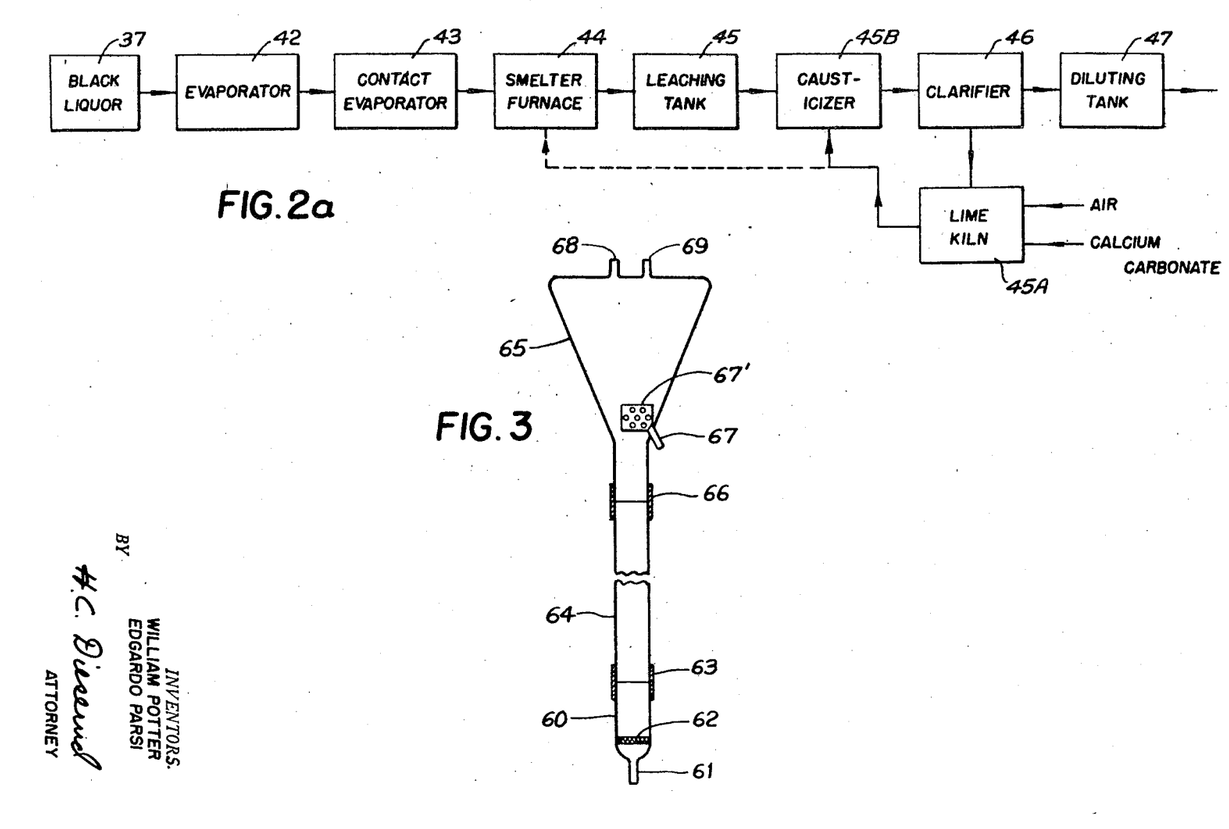
Fig. 2a is a flow sheet illustrating a modification of a portion of the process of Fig. 2.
Fig. 3 is a diagrammatic view of a column suitable for carrying out the method of this invention.

Lime may be added to the green liquor, after smelting, yielding a white liquor with about 50% sulfidity. This process is desirable if calcium scale formation is troublesome when lime is present during the smelting operation. As shown in Fig. 2a, which is a flow sheet illustrating a modification of a portion of Fig. 2, calcium carbonate is burned in a lime kiln 45A to yield lime. The lime therefrom is added to the dissolved smelt from the leaching tank 45 in a causticizing tank 45B. The lime reacts with the sodium carbonate of the green liquor to produce sodium hydroxide and calcium carbonate. The latter being insoluble is precipitated out in clarifier 46. The liquor from clarifier 46, which contains primarily sodium sulfide and sodium hydroxide (white liquor), is passed to diluting tank 47 where it is diluted with water or with effluent from the exchange absorption step. The calcium carbonate recovered in clarifier 46 may be supplied to lime kiln 45A for use in preparing additional lime.

Lime may be added before the smelting step, as shown by the dashed line in Fig. 2a, yielding a white liquor having a sulfidity of about 85%. Lime from kiln 45A is added to the evaporated black liquor influent to the smelting furnace 44. The smelting furnace ash contains primarily sodium sulfide, sodium carbonate and lime. The ash is discharged to the leaching tank 45 where it is for the most part dissolved in water or effluent from an exchange absorption step. In the leaching tank 45 the calcium hydroxide formed as the lime is dissolved in water reacts with the sodium carbonate to produce calcium carbonate and sodium hydroxide. The calcium carbonate and other insoluble matter is removed from the liquor in clarifier 46, leaving a white liquor composed primarily of sodium sulfide and sodium hydroxide. If desired, lime may be added both to the smelter influent and to the green liquor.

It has been found that iron ions present in the green or white liquor will be absorbed on the weakly acid exchanger in column 49 and will for the most part be removed by the regenerating solution in a continuous operation. Iron present in the fresh cooking liquor interferes with the production of high quality bleached pulp. By passing the green liquor solution through a weakly acid ion exchanger 48, which is initially in the sodium form, the iron will be effectively removed, the deep green color of the liquor then changing to a pale green. The efficiency of removal of iron in absorber 48 increases somewhat with the age of the green liquor solution. It has been found that, for a green liquor having a sodium concentration of 1.7 N, approximately 500 volumes may be passed through 1 volume of Amberlite IRC-50 before the resin is exhausted. To regenerate absorber 48, 1 N hydrochloric acid may be passed through the resin, the column then being returned to the sodium form by passing 1 N sodium carbonate solution therethrough.

The green liquor solution is then passed to a weakly acid exchange column 49, where sodium is absorbed and hydrogen sulfide is liberated, and thence to a strongly acid exchange column 50 where additional sodium is absorbed and hydrogen sulfide and carbon dioxide are evolved. In the case of white liquor, no carbon dioxide is evolved. The effluent liquor from column 50 may be discarded or returned in part to the leaching tank 45 and/or the diluting tank 47 to prepare fresh green or white liquor solution for subsequent absorption steps. The columns are then washed with water as explained above in connection with Fig. 1. The gases liberated in the exchangers are sent to a hydrogen sulfide burner 51 where sulfur dioxide is formed by combustion of the hydrogen sulfide with the oxygen of the air. The dilute sulfur dioxide gas formed may be sent upflow through the absorber 52 wherein it is absorbed in cold water. Nitrogen, carbon dioxide and other unabsorbed gases are discharged from the absorber through the vent line indicated. The absorber may suitably be a tower packed with Raschig rings through which the gases are passed upwardly and cold water is passed downwardly. On the other hand, if it is desirable for the regeneration to use a sulfurous acid more concentrated than that which can be prepared in this manner, the dilute sulfur dioxide gas may be passed upwardly through a bed 54 of weakly basic anion exchange resin in the basic form as described in Dutch Patent 45,425 whereby the sulfur dioxide is absorbed. Subsequently, steam is passed upwardly through the bed 54, as described in Dutch Patent 55,207, releasing the sulfur dioxide in substantially pure and concentrated form. Inevitably some sulfur is lost in the pulp washing, smelting and exchange operations requiring therefore some make-up. This may be accomplished by means of the sulfur burner 53, wherein sulfur dioxide gas is formed by burning sulfur in air.

The resins in the columns 49 and 50, which have been substantially exhausted of their hydrogen, are restored to the hydrogen form by passing the solution of sulfurous acid from exchanger and/or absorber 52 through the strong exchange column 50 and thence through the weak column 49 as described above. The columns are then washed with water as described above in connection with Fig. 1. The waste wash water from this step may be supplied to absorber 52.

The regeneration of the resins to the hydrogen form may be only partially completed, but they are restored sufficiently to serve effectively in a repetition of the absorption operations. The effluent from the regeneration step is passed to the fresh liquor storage tank 31. Apparatus for adding sodium carbonate or hydroxide or the like to the regenerant effluent to adjust the fresh cooking liquor to the desired pH may be provided, although it has not been shown in the drawing.

By appropriate conduct of the operations, i. e. by control of the extent of exhaustion of the hydrogen of the resin during contact with the green liquor and the extent of regeneration during contact of the resin with the sulfurous acid; and by the employment of sulfurous acid of appropriate concentration in the regeneration step, the effluent will provide a fresh liquor of suitable character for use in a subsequent digestion operation. It will be understood, however, that if the effluent is not of the character ultimately desired it may suitably be modified by concentration or dilution with or without the addition of other chemicals such as sodium carbonate and the like. Usually it will be found necessary or desirable to add sodium carbonate or sodium hydroxide to the effluent for the purpose of neutralizing the residual acidity of the sulfurous acid employed in regeneration and to make up for unavoidable losses of sodium. Therefore sufficient sodium carbonate or the like is preferably added to the regeneration effluent for this purpose before it is passed to the storage tank 31. Moreover, the cation base content of the liquor passed to the storage tank should be sufficiently above that actually desired for cooking purposes to offset the diluting effect of the portion of the waste liquor passed directly from the black liquor tank 37 to the tank 31.

It will be understood that the apparatus employed in the process above described and schematically indicated in Figs. 2 and 2a includes such items as pumps, valves, vents, condensers, coolers, boilers, precipitators, agitators, motors, blowers, storage vessels, and similar auxiliary equipment, which, while not shown in the drawing, are employed to enable the various procedures explained to be properly carried out. The direction of flow of the various gases and liquids should be such as to facilitate the particular operations involved. Thus, in the operation of the ion exchange column it has been found desirable to pass the liquids upwardly through the column when gases are evolved as a result of the ion exchange. Even in the absence of such gas evolutions it is often desirable to provide upward flow of the liquids to overcome the tendency of the resin to become compacted due to swelling in the course of the reaction.

In a specific example of an operation in accordance with the foregoing, on a laboratory scale, the columns were formed of Pyrex glass having an internal diameter of 3.7 cm. The weak cation exchange column had a height of 115 cm. and the strong cation exchange column had a height of 105 cm. Each column had a conical disengaging section of inside height 22 cm. and largest inside diameter 15 cm. A suitable column of this type, for use in the method of the invention, is illustrated in Fig. 3. The weak exchange column contained 500 g. of surface dried Amberlite IRC-50 (a weakly acid exchanger of the carboxylic type based on polyacrylic acid and manufactured by Rohm and Haas Company in accordance with the teaching of D'Alelio Patent No. 2,340,111 granted January 25, 1944), in the hydrogen form containing 50 percent water by weight. The strong exchange column contained 500 g. of surface dried Dowex-50 (a strongly acid exchanger of the sulfonic acid type based on sulfonated cross-linked polystyrene and manufactured by Dow Chemical Company in accordance with the teaching of D'Alelio Patent No. 2,366,007 granted December 26, 1944, Bauman Patent No. 2,466,675 granted April 12, 1949 and Boyer Patent No. 2,500,149 granted March 14, 1950) containing 40 percent water by weight. The Amberlite IRC-50 had a capacity of 4 milliequivalents per surface dried gram and the Dowex-50 had a capacity of 3.0 milliequivalents per surface dried gram.

Recovery of chemicals from the green liquor in the form of fresh sodium sulfite solution was accomplished in a five-step, two-hour, semi-continuous cycle of the type described above. The plant operated these cycles continuously twelve per day. In a 12-cycle day, there was a total throughput of 5.6 gallons of diluted green liquor containing 1.17 lbs. of sodium and 0.42 lb. of sulfur; 7.6 gallons of fresh sulfite solution were produced. This solution (neutralized with 0.6 lb. of sodium carbonate) is sufficient cooking liquor for about 1/200 of a ton of semi-chemical pulp. In the process 43.3 gallons of water were used daily.

The five steps of the process are as follows:

(1) Semi-chemical green liquor which has been clarified and purified of iron and which contained $Na_2S$ and $Na_2CO_3$ in a sulfidity ratio of about 57 percent was diluted to a total sodium concentration of 1.67 N and passed upwardly through the weakly acid IRC-50. Sodium was exchanged for hydrogen on the resin, and hydrogen sulfide was liberated. The green liquor, partly stripped of sodium and sulfur, was withdrawn from the IRC-50 and passed upwardly through the strongly acid Dowex-50. More sodium was absorbed by this resin and both hydrogen sulfide and some carbon dioxide were liberated. The stripped green liquor was passed to waste.

(2) The columns were washed with water as described hereinbefore to remove absorbed sulfide.

(3) Sulfurous acid solution (3.7 percent) was passed downwardly, first through the Dowex-50 where it picked up sodium and then through the IRC-50 where it eluted more sodium, producing thereby a mixture of sodium bisulfite and neutral sodium sulfite. This liquor was neutralized and became cooking liquor for the next cycle.

(4) The residual acid was washed from the resin.

(5) The resin was "fluidized" with water upflow to remove air and achieve an even separation of resin particles in preparation for the gas evolution in the green liquor run. That is, the air in the resin voids was replaced with water before the flow of green liquor was begun in order that the resin would be suspended at the beginning of the run and the gases formed would be readily evolved.

The resin beds are supported at the bottom by two double thicknesses of 28-mesh polyvinylidine chloride screening, such as that sold under the trade name of Lumite (equivalent to No. 40 U. S. standard sieve). No passage of resin through this system was observed. Above the resin levels each column contained a plastic filter box covered with 28-mesh Lumite screening. The filter box serves as a screen to prevent the loss of resin through the exit pipe. Resin fines and sulfur, which may be formed during the absorption or regeneration steps, obstruct liquid flow through the resin beds. The green liquor generally contains some polysulfides which decompose to give free sulfur when the pH is reduced during the absorption cycle. The resin fines and sulfur are withdrawn through these filters by passing most of the absorption effluents through them. The remaining portion of the effluent passes out through connections at the bottom of the column. The portion of the liquid withdrawn through the filters was passed through a series of settling tanks or traps wherein the resin fines settle out and are subsequently returned to the columns.

The laboratory size ion exchange column shown in Fig. 3 comprises a base section 60 having an inlet and outlet connection 61 in the bottom thereof for the admission and removal of fluids during various stages of the cycle. A screen 62 is also provided in section 60 for supporting the resin bed. Attached to section 60 by a coupling 63 is a cylindrical body member 64 which contains most of the resin bed. An open narrow end of a conical disengaging section 65 is attached to the upper end of body member 64 by a coupling 66. A connection 67 is provided near the narrow end of conical section 65 for drawing off effluent accumulated in conical section 65 during the absorption portion of the cycle. Connection 67 is provided with a plastic filter box as described above to prevent loss of resin therethrough. Connections 68 and 69 are provided in the closed upper end of conical section 65 for the removal of gases and the admission of fluids such as sulfurous acid solution and regeneration wash water at appropriate times during the cycle.

The resins and gases are separated from the solution in the conical section 65 of the column shown in Fig. 3. In this section the linear velocity of the solution decreases owing to the enlarging cross section, thereby permitting the resin to separate from the solution and gases and to return to the body of the column. The gases also are separated from the solution in this section of the column without substantial entrainment of the solution. In the operation described, the liquor passing through the weak exchanger was accumulated in the conical section of column 2 (Fig. 1) before passing to column 3 and the liquor passing through the strong exchanger was accumulated in the conical section of column 3 before passing on to the treated waste liquor tank 4.

Most of the green liquor which had passed through column 2 and accumulated in the conical section thereof was led directly to column 3. After completion of the absorption in column 2, the liquor contained in the voids of the resin bed was then drained from the bottom of the column and subsequently passed to column 3. In this way, the liquor occupying the free volume in the resin was for the most part passed to column 3. In a similar way the liquor which had passed into column 3 was removed at the completion of the absorption cycle in that column. Complete draining of the solutions from the columns may be facilitated by passing air through the columns before and after passing wash water therethrough. Passing air through the columns before wash water will aid in removing liquor or sulfurous acid from the resin, thus requiring less wash water. Passing air therethrough after the wash water will remove most of the wash water retained on the resin, thus reducing dilution in the next step.

In a typical cycle in continuous operation at a steady state, the green liquor influent to column 2 had a concentration of 1.65 milliequivalents of sodium per milliliter and contained 1820 milliequivalents of sodium. After the exchange reaction 206 milliequivalents of sodium were in the treated liquor effluent from the system; 78 milliequivalents of sodium were in the wash water effluent after the absorption step. In washing 2000 cc. of water were used.

The regenerating solution had a concentration of 1.15 milliequivalents of sulfurous acid per milliliter.

The regeneration effluent contained 1320 milliequivalents of sodium and 549 milliequivalents of hydrogen, of concentration 0.537 milliequivalents of hydrogen per milliliter.

The wash water following regeneration contained 170 milliequivalents of sodium and 878 milliequivalents of hydrogen. A total of 2400 milliliters of wash water was used.

The sodium recovery was 62 percent of the total amount of sodium in the cooking liquor. Thirty percent of the total sulfur in the cooking liquor was recovered. However, 15 percent of the sodium in the cooking liquor had been lost in the pulp and in the smelter. The overall recovery of sodium from the green liquor was 73 percent.

The effluent resulting from the passage of green liquor through the columns was not further used. Similarly the absorption and regeneration wash waters were discarded. As explained above, increased recovery is possible by using these solutions in the process.

In carrying out the five step process on a typical white liquor from a neutral semi-chemical process smelt, it has been found possible to operate the process using a large column of carboxylic resin and a smaller column of sulfonic resin in series. In this case, a more dilute $SO_2$ solution may be used as compared with that required for the green liquor process. The decreased concentration of the $SO_2$ solution results in substantially decreased Donnan absorption.

In a typical cycle in continuous operation similar to that above at a steady state, a white liquor (of 52 percent sulfidity, prepared by causticization of green liquor as shown in Fig. 2a) of concentration of 1.65 milliequivalents of sodium per milliliter and containing 1820 milliequivalents is passed into column 2. The week cation exchange column contains 475 grams of surface-dried Amberlite IRC-50 (containing in the hydrogen form 50 percent water by weight) and the strong exchange column contains 110 grams of surface-dried Dowex-50 (containing in the hydrogen form 40 percent water by weight). The regenerating solution is 2.8 percent $SO_2$. The sodium recovery is 82 percent of the sodium in the white liquor while the sulfur recovery is 79 percent of that in the white liquor. In a similar procedure, using a white liquor of 85 percent sulfidity (prepared by adding lime to the influent to the smelter), a sodium recovery of 82 percent and a sulfur recovery of 78 percent of that in the white liquor has been attained.

Figure 4:
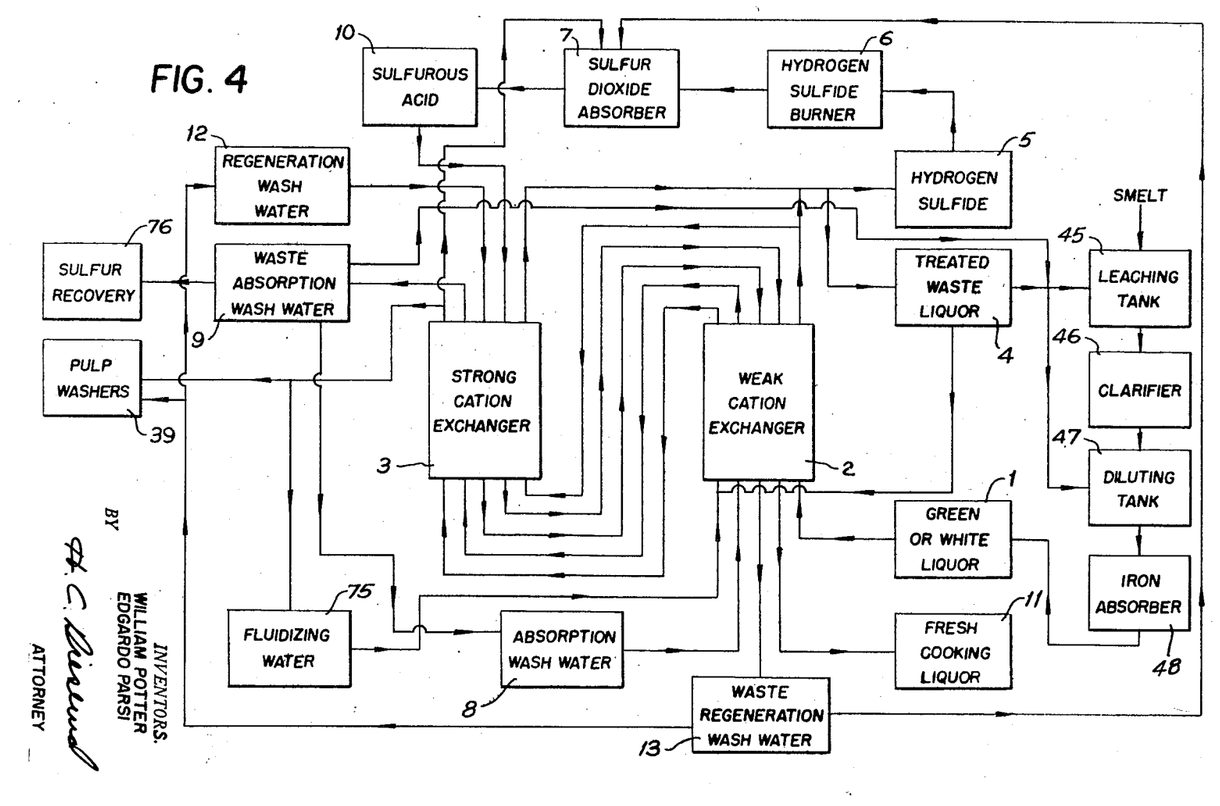
Fig. 4 is a diagrammatic view illustrating preferred recycling steps, in accordance with the invention, in the process of Fig. 1.

Sodium recovery in the green liquor ion-exchange process may be greatly increased through the use of various recycling steps, as pointed out hereinbefore. An ion exchange process employing a preferred combination of recycling steps is illustrated in Fig. 4. The first preferred recycling step comprises employing the effluent from the exchange absorption step as a solvent for the smelted black liquor. As shown in Fig. 4, the green liquor from tank 1 is passed upflow firstly through weak cation exchanger 2 and secondly through strong cation exchanger 3, the effluent therefrom being passed to treated waste liquor tank 4. This absorption step effluent may be passed to leaching tank 45 for use as a solvent for the smelted black liquor. All or part of the liquor from tank 4 may, if desired, be supplied to diluting tank 47. In either event, the absorption step effluent will have been used in making up the green liquor solution supplied to tank 1.

The second preferred recycling step comprises employing the regeneration wash water in preparing fresh sulfurous acid solution for use in succeeding regeneration steps. After sulfurous acid from tank 10 has been passed through exchangers 3 and 2, water from tank 12 is passed downflow firstly through exchanger 3 and secondly through exchanger 2 and is collected in a tank 13. The waste regeneration wash water from tank 13 is supplied to sulfur dioxide absorber 7 for use in absorbing the sulfur dioxide gas generated in hydrogen sulfide burner 6.

The third preferred recycling step comprises supplying the fluidizing water to the pulp washers. Before the absorption step, water from a tank 75 is sent upflow firstly through exchanger 2 and secondly through exchanger 3 to fluidize the resins, i. e., to remove air and to achieve an even separation of resin particles in preparation for gas evolution when the green liquor is passed therethrough. The fluidization water effluent from exchanger 3 is sent to the pulp washers and may be used as part of the wash water supplied to the second section of washer 39 (Fig. 2).

These three steps constitute a preferred recycling procedure. In one form of the ion exchange process without recycling, a 54% recovery level of sodium from green liquor is achieved. By employing the preferred combination of recycling steps, the recovery level is increased to 87%. The recovered sulfur as $H_2S$ gas is reduced from 48% of the green liquor sulfide content to 31%. This reduction in the volume of evolved $H_2S$ is due to the altered method of operation of the process; considerable free $H_2S$ remains dissolved in the absorption wash stream because the increased sodium recovery requires about a two-fold increase in the amount of strongly acidic resin used. The volume of green liquor used in each cycle remains largely at the bottom of the resin bed in the void spaces. Exchange of the dissolved sodium is incomplete until the green liquor is washed through the exchanger with water. The resulting dilution does not affect the sodium absorption by the strongly acidic resin but it does have the effect of retaining considerable sulfur in solution as dissolved $H_2S$. This sulfur content is removable by heat or by processing the effluent streams from the absorption step with $CO_2$. As shown in Fig. 4, the waste absorption wash water collected in tank 9 may be passed to a suitable sulfur recovery process 76.

In a laboratory operation of a preferred recycle system, the green liquor passes upflow in series through two resin beds containing, respectively, a weakly acidic resin such as Amberlite IRC-50 and a strongly acidic resin such as Dowex-50. As compared with no recycle, the volume of Amberlite IRC-50 is slightly reduced (from 19.4 liters to 18.1 liters) while the the volume of Dowex-50 is substantially increased (from 17.8 liters to 34.4 liters) in order to increase the quantity of absorbed sodium. The residual resin green liquor content is next swept through the system by chasing the green liquor immediately with water wash, thus permitting the absorption of desired sodium content by the Dowex-50 column. In this manner, 80 percent of the green liquor sodium content is removed by the resins.

The resins are next regenerated with 4.2 percent aqueous

SO₂ containing 258 grams sulfur and 152 grams sodium as soda ash. (The optimum SO₂ concentration under non-recycle conditions of low sodium recovery is about 3.7 percent.) In the regeneration effluent stream which contains the recovered sodium, there are 425 grams of sodium as soda ash (87.5 percent of the green liquor sodium content) and 147 grams of sulfur. The residual acid is next washed from the resins with water. The effluent wash water contains 152 grams of sodium as soda ash and 108 grams of sulfur. The entire stream is recycled for SO₂ makeup for use as regenerant in a succeeding cycle. The SO₂ makeup which is required to raise the available acid to 1.31 N (corresponding to 4.2 percent SO₂) amounts to 147 grams of sulfur.

As indicated hereinbefore, a number of other recycling steps may be employed. These steps are also illustrated in Fig. 4. For example, a portion, preferably a latter portion, of the absorption step effluent collected in tank 4 may be passed through the columns as fluidizing water in a subsequent fluidizing step. All or part of the waste absorption step wash water collected in tank 9 may be supplied to leaching tank 45 and/or diluting tank 47 for dissolving the smelt and producing the green or white liquor supplied to tank 1. All or part of the waste regeneration wash water collected in tank 13 may be supplied to sulfur dioxide absorber 7 for producing sulfurous acid. All or part of the regeneration wash water may also be supplied to the pulp washers 39. All or part of the regeneration and absorption wash waters collected in tanks 13 and 9, respectively, may be reused for the same purposes in succeeding wash steps. All or part of the effluent fluidizing water may be reused as fluidizing water, may be sent to sulfur dioxide absorber 7 and/or may be sent to pulp washers 39.

It is evident that, when recycling steps are employed, there will be a tendency for iron present in the liquor to build up in quantity during succeeding cycles. Iron present in cooking liquor interferes with the production of high quality bleached pulp. Iron ions in the liquor may, however be removed by passing the green or white liquor through weakly acid ion exchange column 48, as described hereinbefore. While it has been found desirable to employ an iron removal step even in the absence of recycling steps, the need for iron removal becomes especially great in connection with recycling because of the tendency for the quantity of iron in the liquor to build up in succeeding cycles.

A number of features which do not form a part of the present invention have been described herein for purposes of clarity. These features form a part of an invention of Andrew A. Kasper and William E. Katz disclosed and claimed in their copending patent application Serial No. 284,604, filed concurrently herewith.

While various embodiments of the present invention have been described in considerable detail, it will be understood that other embodiments or modifications than those specifically suggested are within the scope of the invention as defined by the appended claims. The apparatus and procedures specified for the various steps of the several processes disclosed are to be understood as being merely illustrative and not restrictive. A variety of different cation exchange resins of the character of those specifically mentioned herein may be employed in the various columns disclosed. Where specific resins have been mentioned, resins of the same strongly or weakly acid types may be substituted therefor.

What is claimed is:

In a repetitive cyclic ion-exchange method of recovering sodium ions from waste liquor from a sulfite pulping operation and producing fresh cooking liquor which method comprises passing, as an absorption solution, through at least one substantially vertically disposed bed of synthetic organic cation exchange resin primarily in the hydrogen form, successive quantities of an aqueous alkaline solution having sodium and sulfide constituents derived from said waste liquor, said absorption solution being passed upwardly through said bed of resin, and passing a quantity of available sulfurous acid downwardly through said bed to regenerate said resin subsequent to the passage of each of said successive quantities of absorption solution; the steps of collecting a first portion of acidic effluent from the last mentioned step, during each passage of a quantity of available sulfurous acid through said bed, for use as a fresh cooking liquor, collecting a second portion of said acidic effluent, and passing said second portion of said acidic effluent through said resin after the absorption step in a succeeding cycle.

References Cited in the file of this patent

UNITED STATES PATENTS

| | | |
|---|---|---|
| 1,605,926 | Drewsen | Nov. 9, 1926 |
| 1,605,927 | Drewsen | Nov. 9, 1926 |
| 1,892,100 | Bradley | Dec. 27, 1932 |
| 1,934,655 | Bradley et al. | Nov. 7, 1933 |
| 2,029,616 | Haglund | Feb. 4, 1936 |
| 2,104,501 | Adams et al. | Jan. 4, 1938 |
| 2,191,853 | Holmes | Feb. 27, 1940 |
| 2,385,955 | Tomlinson | Oct. 2, 1945 |
| 2,393,249 | Holmes | Jan. 22, 1946 |
| 2,656,244 | Gray et al. | Oct. 20, 1953 |
| 2,656,245 | Gray et al. | Oct. 20, 1953 |
| 2,656,249 | Gray et al. | Oct. 20, 1953 |
| 2,736,635 | Haywood | Feb. 28, 1956 |

FOREIGN PATENTS

| | | |
|---|---|---|
| 859,205 | France | June 3, 1940 |
| 519,848 | Great Britain | Apr. 8, 1940 |

OTHER REFERENCES

Selke and Bliss: "Continuous Countercurrent Ion Exchange," Chemical Engineering Progress, October 1951, pages 529–533.

"Ion Exchange," Chemical Engineering, July 1927, pages 123–127.

Ind. & Eng. Chemistry, February 1943, pages 186–192.